United States Patent
Chung

(10) Patent No.: US 6,226,282 B1
(45) Date of Patent: May 1, 2001

(54) METHOD OF SEARCHING REVERSE TRAFFIC CHANNELS IN A CDMA MOBILE RADIO COMMUNICATION SYSTEM

(75) Inventor: Chae-Hun Chung, Kyoungki-do (KR)

(73) Assignee: Hyundai Electronics Ind. Co., Ltd., Kyoungki-do (KR)

(*) Notice: Subject to any disclaimer, the term of this patent is extended or adjusted under 35 U.S.C. 154(b) by 0 days.

(21) Appl. No.: 09/220,229

(22) Filed: Dec. 23, 1998

(30) Foreign Application Priority Data

Dec. 27, 1997 (KR) .................................................. 97-75509

(51) Int. Cl.$^7$ ................................ H04B 7/216; H04J 3/06
(52) U.S. Cl. ......................... 370/335; 370/350; 375/142
(58) Field of Search .................................. 370/335, 320, 370/342, 350, 503; 375/140, 141, 145, 149, 142

(56) References Cited

U.S. PATENT DOCUMENTS

| 5,544,196 | * | 8/1996 | Tiedemann, Jr. et al. | 375/200 |
| 5,577,025 | * | 11/1996 | Skinner et al. | 370/22 |
| 5,627,835 | * | 5/1997 | Witter | 370/320 |
| 5,671,221 |   | 9/1997 | Yang . |  |
| 5,673,259 |   | 9/1997 | Quick, Jr. . |  |
| 5,748,104 |   | 5/1998 | Argyroudis et al. . |  |
| 5,805,648 | * | 9/1998 | Sutton | 375/367 |
| 5,818,866 | * | 10/1998 | Wilk | 375/200 |
| 5,920,554 | * | 7/1999 | Nakamura et al. | 370/335 |

* cited by examiner

Primary Examiner—Chau Nguyen
Assistant Examiner—Phuongchau Ba Nguyen
(74) Attorney, Agent, or Firm—Reed Smith LLP

(57) ABSTRACT

A method of searching reverse traffic channels in a code division multiple access (CDMA) mobile radio communication system for allowing for acquisition of reverse traffic channels without increase or decrease of size of a search window for traffic channels, the method comprising the steps of: storing an offset by a propagation delay after acquiring a reverse access channel; determining whether or not a pseudonoise (PN) random delay is employed for the reverse access channel and, when the PN random delay is used, calculating the PN random delay using a hash function with a factor of an electronic serial number (ESN) transmitted from a mobile station; computing the stored offset and the PN random delay and setting a new offset to a result of the computing; setting a center of a search window for searching the reverse traffic channel to the new offset and establishing the search window; and searching a reverse traffic channel preamble with the established search window.

4 Claims, 5 Drawing Sheets

METHOD OF SEARCHING REVERSE TRAFFIC CHANNELS IN A CDMA MOBILE RADIO COMMUNICATION SYSTEM

BACKGROUND OF THE INVENTION

1. Field of the Invention

The present invention relates to method of searching reverse traffic channels in a code division multiple access (CDMA) mobile radio communication system and more particularly to a method of searching reverse traffic channels for allowing for acquisition of reverse traffic channels without increase or decrease of size of a search window used for acquisition of a traffic channel when pseudonoise (PN) random delays are employed for reverse access channels and increase or decrease, by changing a location of the search window through a control method of shifting the center of the search window.

2. Description of Related Art

Generally, a mobile radio communication system is a communication system for mobile units such as human beings, automobiles, ships, trains, and aircraft and includes a mobile telephone (a portable telephone and automobile telephone), harbor telephone, aircraft telephone, mobile pay phone (which is installed at a train, sightseeing boat, express bus, and the like), radio paging, cordless telephone, satellite mobile radio communication, amateur radio communication, and fishery radio communication.

Such mobile radio communication has been implemented through an advanced mobile phone service system using an analog, a CDMA system using a digital, a time division multiple access (TDMA) system, and a frequency division multiple access (FDMA) system.

The CDMA system comprises: a mobile station 1 selectively or simultaneously supporting the services of the AMPS and CDMA systems, for allowing subscribers to communicate through a mobile communication network; a base transceiver subsystem 2 for performing communication with the mobile station 1 in a radio area using a protocol defined in the IS-95; a base station controller 3 for controlling a radio link and a cable link and performing an hand off function for maintaining continuity of a call even while the mobile station 1 is moving; a mobile switching center 4 for forming a speech path for a subscriber and performing access to another communication network; and a home location register 5 containing subscribe information, for transmitting and receiving signals to and from the mobile switching center 4. The CDMA system realizes the call of the mobile station 1 through the base transceiver subsystem 2, the base station controller 3, and the mobile switching center 4.

The home location register 5 is a system for storing the subscriber information.

In such general CDMA mobile radio communication system, all mobile stations and base transceiver subsystems adjust their time sync on the basis of the CDMA system reference time.

Specifically, the mobile station (terminal equipment) acquires time information of the long code timing and system timing of the CDMA system from a sync channel message received from the base transceiver subsystem and respectively synchronizes the long code timing and the system timing with its long code timing and system timing. Through such synchronization, the mobile station reconstitutes signals transmitted from the base transceiver subsystem, and base transceiver subsystem reconstitutes signals transmitted from the mobile station.

The procedure that the mobile station acquires the time information from the message transmitted from the base transceiver subsystem and then establishes a reference time so as to be synchronous to the base transceiver subsystem will now be described in detail.

There exist a pilot channel, a sync channel, a paging channel, and a forward traffic channel in a forward link (from the base transceiver subsystem to the mobile station), and there exist an access channel and a reverse traffic channel in a reverse link (from the mobile station to the base transceiver subsystem). The mobile station acquires the pilot channel and is synchronous to the acquired pilot channel so as to acquire the sync channel (sync channel message). The mobile station acquires the time information from system time data, SYS_TIMEs, contained in the sync channel message. The system time data, SYS_TIMEs, is the system time at a point obtained by subtracting a pilot PN offset from a point beyond 320 ms which is the end of a last 80 ms super frame in the sync channel message received at the mobile station.

The reference time of the mobile station is established to a point obtained by adding the signal propagation delay from the base transceiver subsystem to the mobile station and the signal process delay at the mobile station to the reference time of the base transceiver subsystem. The mobile station transmits a signal at such reference time established as described above. The CDMA system generates and extracts the signals with a factor of time, so the mobile station should establish the reference time and transmits the signal in synchronization with the established reference time. This reverse link signal is delayed by the propagation delay before being received at the base transceiver subsystem. In other words, the base transceiver subsystem transmits the signal in synchronization with the system time, and the reception of the reverse link signal at the base transceiver subsystem is delayed (this delay is called hereinafter "bothway propagation delay").

The base transceiver subsystem searches a reverse access channel of the mobile station while time-delaying on the basis of the system time. The access channel is used before making a call (traffic channel) between the mobile station and the base transceiver subsystem and contains many messages such as a registration message, an order message, a data burst message, an origination message through which the mobile station requests an originating call, a page response message which is a response message to an incoming call, and an authentication challenge response message.

When the base transceiver subsystem acquires the access channel sent by the mobile station while searching the reverse access channel, a time offset at this point corresponds to the bothway propagation delay which is the time delay from the base transceiver subsystem via the mobile station back to the same base transceiver subsystem. The mobile station receives a channel assignment message which the base transceiver subsystem sends out after acquiring the access channel. Then the mobile station sends a traffic channel preamble to the base transceiver subsystem to maintain a link with the base transceiver subsystem. The traffic channel preamble is sent to the base transceiver subsystem to aid the base transceiver subsystem in performing initial acquisition of a reverse traffic channel and consists of frames of 192 zeros at the 9600 bps rate. The base transceiver subsystem establishes a search window centering around the offset (the bothway propagation delay on the basis of the system time) obtained when the access channel is acquired and then searches the reverse traffic channel preamble.

When multiple mobile stations are located in the same place or the places which are distant the same propagation delay from the base transceiver subsystem within the coverage area of the base transceiver subsystem, the mobile stations send messages to the base transceiver subsystem on the access channels at the same time. The messages from the different mobile stations are received at the base transceiver subsystem at the same time, and therefore, collision of the access channels occurs. Consequently, the base transceiver subsystem cannot demodulate the messages transmitted from the mobile stations. In other words, since each mobile station uses its unique long code, the reverse traffic channels from multiple mobile stations are distinguishable, but the access channels use the same long code, so they are indistinguishable. In this regard, if the messages are simultaneously received at a receiver of the base transceiver subsystem, collision between the access channels occurs.

To solve this problem in the CDMA mobile radio communication system, that is, to prevent the collision between the access channels from multiple mobile stations at the base transceiver subsystem when transmitting the access channels on the reverse links (from the mobile stations to the base transceiver subsystem), the base transceiver subsystem randomly establishes time delays for the reference time with respect to each mobile station (hereinafter, this will be called a PN random delay) so that the mobile stations can transmit the access channel data at different times given in accordance with each PN random delay, preventing collision between the access channels at the receiver of the base transceiver subsystem. Such PN random delay is produced through a hash function using an electronic serial number (ESN) of the mobile station (IS-95 Spec, 6.6.7).

FIG. 2 is a diagram for describing a conventional method of searching a reverse traffic channel in the CDMA mobile radio communication system.

With reference to FIG. 2, the conventional reverse traffic channel search method will now be described. A mobile station transmits an access channel to the base transceiver subsystem using a PN random delay, so transmission of the access channel is delayed to a time point 30 which is established by the PN random delay 20 produced in accordance with the ESN of the mobile station on the basis of an access channel slot boundary 10 arranged at the system time.

The access channel slot boundary 10 indicates an access channel slot and frame boundary when the PN random delay is not used.

When considering on the basis of the system reference time 40 of the base transceiver subsystem, the access channel is received at the base transceiver subsystem at a time point 70 resulting from a delay by the sum of the bothway propagation delay (sum of a propagation delay 50 from the base transceiver subsystem to the mobile station and a propagation delay 60 from the mobile station to the base transceiver subsystem) and the PN random delay 20. An offset 80 after the base transceiver subsystem acquired the access channel corresponds to the sum of the bothway propagation delay and the PN random delay.

Once the mobile station receives a channel assignment message transmitted from the base transceiver subsystem which has acquired the access channel, it transmits a traffic channel preamble to the base transceiver subsystem at a mobile station system reference time 90 to aid the base transceiver subsystem to easily acquire a reverse traffic channel at the time of initial access. The PN random delay is a delay time used for preventing an access collision, so it is used only for the access channel but not used for the transmission of the traffic channel preamble.

The reverse traffic channel preamble has the propagation delay 60, thus being received at the base transceiver subsystem at a time point 110 resulting from a delay by the bothway propagation delay on the basis of a base transceiver subsystem's reference time 100. The base transceiver subsystem sets a center of a search window 130 to a time point 120 resulting from a delay by an offset 80 obtained at the time of acquisition of the access channel on the basis of a system reference time 100 and searches a reverse traffic channel to acquire a reverse traffic channel preamble.

In other words, the center 120 of the traffic channel search window of the base transceiver subsystem is located at the point obtained by adding the PN random delay 20 to the point 110 at which the reverse traffic channel preamble is received at the base transceiver subsystem (the point 110 resulting from the bothway propagation delay on the basis of the system reference time 100).

When a half size 140 of the search window does not exceed the PN random delay 20, the reverse traffic channel preamble cannot be acquired, resulting in fail in making a call. Therefore, the half size 140 of the search window must be greater than the PN random delay 20 to success in making a call.

To satisfy this condition, conventional technology establishes the search window by manually adjusting its size to make the half of the search window size larger than the PN random delay in order to search reverse traffic channels.

According to such conventional technology, as the PN random delay time gets greater, the size of the search window should be greater relative to the delay time. Under these conditions, it takes much time to search traffic channels, thereby deteriorating system performance.

Furthermore, since the size of the search window should be manually increased or decreased as the PN random delay increases or decreases, the conventional technology has drawbacks of wasting time and human resources.

SUMMARY OF THE INVENTION

Accordingly, the present invention is directed to a method of searching reverse traffic channels in a CDMA mobile radio communication system that substantially obviates one or more of the limitations and disadvantages of the related art.

An objective of the present invention is to provide a method of searching reverse traffic channels in a CDMA mobile radio communication system for allowing for acquisition of a reverse traffic channel without increase or decrease of the size of a search window used for acquisition of traffic channels when a PN random delay is employed for a reverse access channel and increases or decreases, by changing a location of the search window through a control method of shifting the center of the search window.

Another objective of the present invention is to provide a method of searching reverse traffic channels in a CDMA mobile radio communication system for allowing for acquisition of a reverse traffic channel by automatically setting a size of a search window equal to or greater than twice the offset determined in accordance with a PN random delay when the PN random delay is applied to a reverse access channel.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a method of searching reverse traffic channels in a CDMA mobile radio communication system includes the steps of: storing an offset by a propagation delay after acquiring a reverse access channel; determining whether or not a PN random delay is employed for the reverse access channel and, when the PN random delay is used, calculating the PN random delay using a hash function with a factor of an ESN transmitted from a mobile station; computing the stored offset and the PN random delay and setting a new offset to a result of the computing; setting a center of a search window for searching the reverse traffic channel to the new offset and establishing the search window; and searching a reverse traffic channel preamble with the established search window.

The offset by the propagation delay consists of a forward propagation delay, a reverse propagation delay, and the PN random delay when the PN random delay is used, and the offset consists of only the forward propagation delay and the reverse propagation delay when the PN random delay is not used.

The new offset is set to a result value of subtracting the calculated PN random delay from the stored offset.

The center of the search window is set to a point obtained by adding the new offset to a system time of a base transceiver subsystem for searching reverse traffic channels.

In another aspect, the present invention provides a method of searching reverse traffic channels in a CDMA mobile radio communication system includes the steps of: storing an offset by a propagation delay after acquiring a reverse access channel, setting a center of a search window to the offset, and determining whether or not a PN random delay is applied to the reverse access channel; when it is determined that the PN random delay is applied to the reverse access channel, calculating the PN random delay using a hash function with a factor of an ESN transmitted from a mobile station; establishing a size of the search window to a value equal to or greater than a predetermined number times the calculated PN random delay; and searching a reverse traffic channel preamble with the established search window.

The center of the search window is set to a point obtained by adding the stored offset to a system time of a base transceiver subsystem for searching reverse traffic channels.

The predetermined number is two at the step of establishing the size of the search window.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

With reference to the accompanying drawings, the present invention will now be described in detail.

Figure 4:
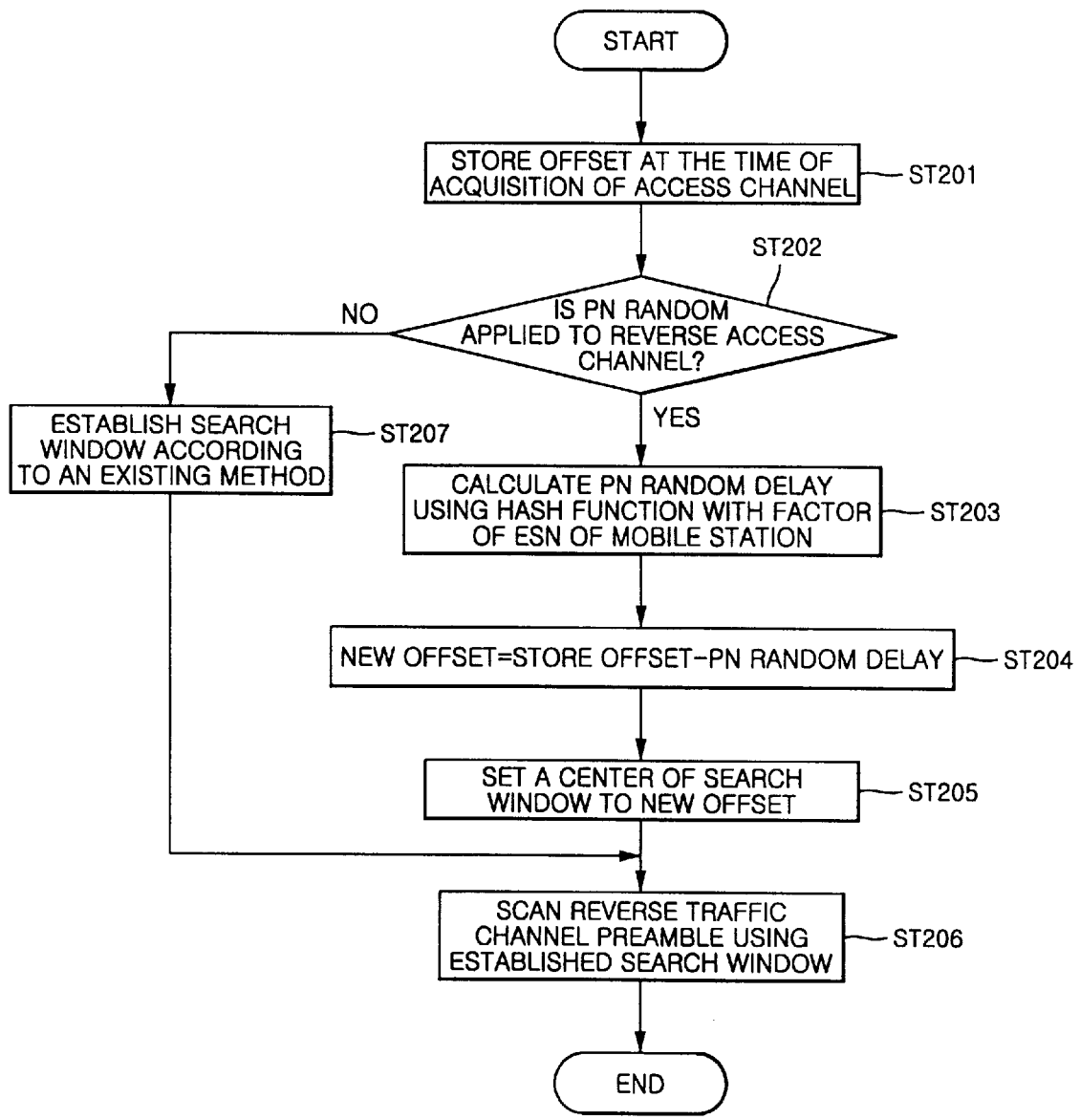
FIG. 4 is a flow chart of a reverse traffic channel search method in a CDMA mobile radio communication system according to the embodiment of the present invention depicted in FIG. 3.

FIG. 4 is a flow chart of a reverse traffic channel search method in a CDMA mobile radio communication system according to one embodiment of the present invention.

As shown in FIG. 4, the method according to one embodiment of the present invention comprises the steps of: storing an offset by a propagation delay on the basis of a system reference time after acquiring a reverse access channel (ST201); determining whether or not a PN random delay is employed for the reverse access channel and, when the PN random delay is employed, calculating a PN random delay using a hash function with a factor of an ESN transmitted from a mobile station (ST 202 to ST203); computing the stored offset and the PN random delay and setting a new offset to a result of the computing (ST204); fixing a center of a search window for searching a reverse traffic channel to the new offset and establishing the search window (ST205); and searching a reverse traffic channel preamble within the established search window (ST206).

Figure 1:
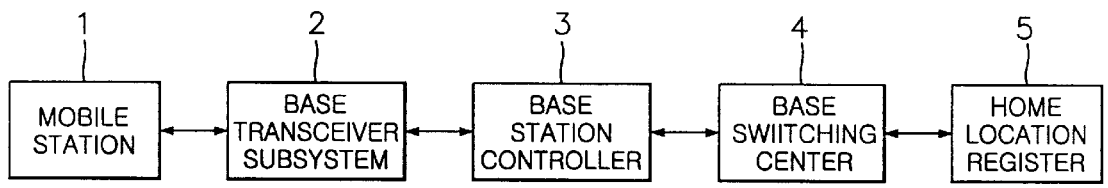
FIG. 1 is a block diagram of a conventional CDMA mobile radio communication system.
Figure 2:
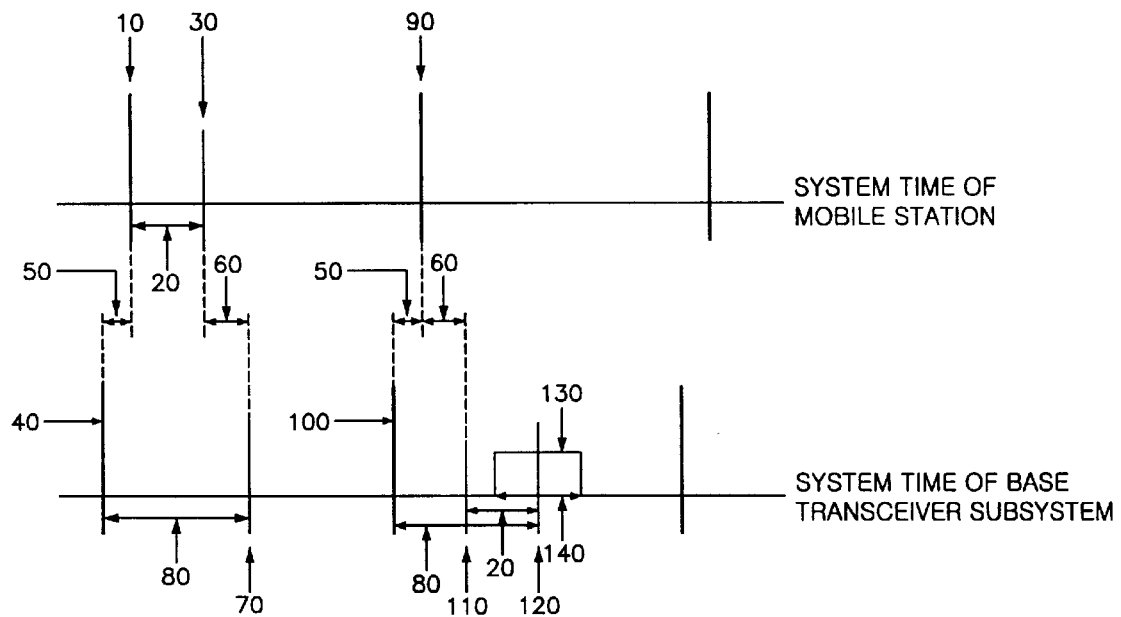
FIG. 2 is a diagram for explaining a conventional reverse traffic channel search method in a CDMA mobile radio communication system.
Figure 3:
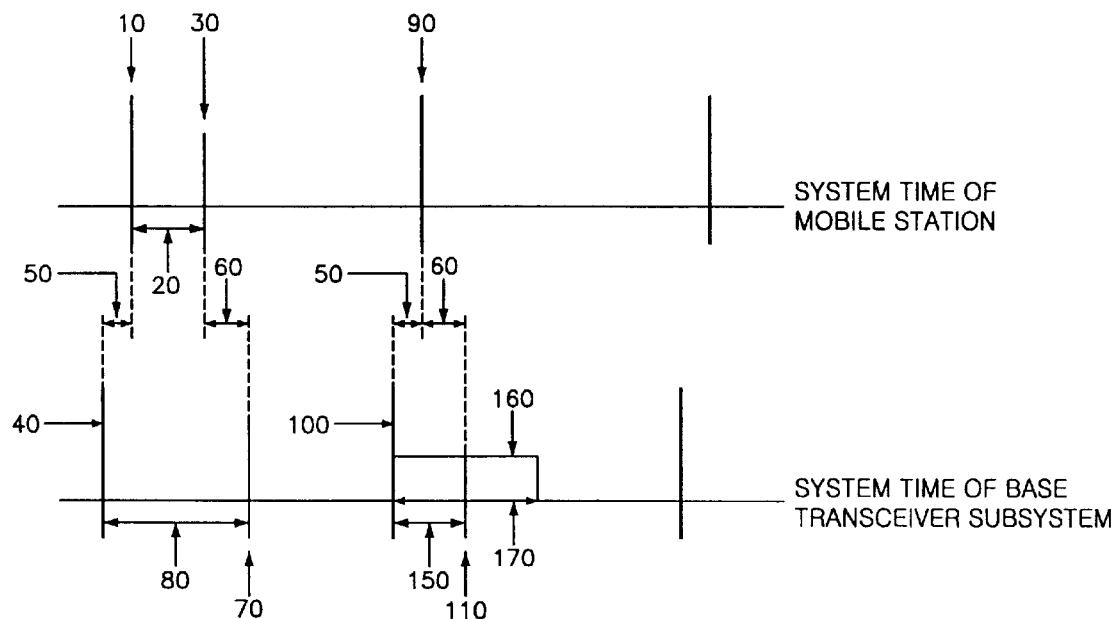
FIG. 3 is a diagram for explaining a reverse traffic channel search method in a CDMA mobile radio communication system according to one embodiment of the present invention.

In advance of describing such reverse traffic channel search method of the present invention with reference to FIG. 3, general concept will now be briefly reviewed.

When a mobile station uses a PN random delay, a base transceiver subsystem computes the PN random delay using an ESN of the mobile station contained in an acquired access channel and, when in conversion from an access channel to a traffic channel, sets a center of a search window for searching a reverse traffic channel preamble to a value obtained by subtracting the computed PN random delay from an offset obtained after the access channel was acquired. Through such operations, it is not necessary to increase the size of the search window of the base transceiver subsystem for reverse traffic channels according to the PN random delay of the mobile station, thereby preventing a delay of the search process occurring by increasing the size of the search window and solving the problem that a call is not made because of insufficient size of the search window.

Referring to such concept of the present invention, a method of actually determining the center of the search window and establishing the search window will now be described.

As shown in FIG. 3, transmission of an access channel employing a PN random delay is delayed by a PN random delay 20 determined in accordance with an ESN of a mobile station on the basis of an access channel slot boundary 10, which is a system reference time of the mobile station, thus the mobile station transmits the access channel at a time point 30.

Reception of the access channel at a base transceiver subsystem is delayed by the sum of the PN random delay 20 and a bothway propagation delay (a sum of a forward propagation delay 50 from the base transceiver subsystem to the mobile station and a reverse propagation delay 60 from the mobile station to the base transceiver subsystem) on the basis of a system reference time 40 of the base transceiver subsystem, so the access channel is received at the base transceiver subsystem at a time point 70. An offset obtained after the base transceiver subsystem acquired the access channel corresponds to the sum of the bothway propagation delay and the PN random delay.

On receiving a channel assignment message which the base transceiver subsystem transmits after acquiring the access channel, the mobile station transmits a traffic channel preamble at its system reference time 90 to maintain a link with the base transceiver subsystem. At this time, the PN random delay used when transmitting the access channel is not used.

Since the reverse traffic channel preamble has the reverse propagation delay 60, reception of the reverse traffic channel preamble at the base transceiver subsystem is delayed by the bothway propagation delay on the basis of a system reference time 100 of the base transceiver subsystem, so the reverse traffic channel preamble is received at the base transceiver subsystem at a time point 110.

To acquire the reverse traffic channel preamble, the base transceiver subsystem sets a new offset to a result value 150 of subtracting the PN random delay 20 obtained using the ESN of the mobile station from the offset 80 obtained after acquiring the access channel. A point 110 obtained by adding the new offset (that is, the bothway propagation delay) to the system reference time 100 is determined as a center of a search window 160. After establishing the search window, the base transceiver subsystem searches the reverse traffic channel preamble. The size of the search window is equal to that of a search window determined according to conventional technology.

FIG. 4 is a flow chart of a reverse traffic channel search method according to the embodiment of the present invention as described above.

As shown in FIG. 4, after acquiring the access channel, the base transceiver subsystem stores the offset by the propagation delay on the basis of the system reference time 40 of the base transceiver subsystem (ST201).

Whereas the offset consists of only the bothway propagation delay when the PN random delay is not used, it consists of the bothway propagation delay and the PN random delay when the PN random delay is used.

Subsequently, it is determined whether or not the PN random delay is applied to the reverse access channel (ST202). When it is determined that the PN random delay is not used, the center of the search window is set to the stored offset through the same way as employed by the conventional technology and the search window is established on the basis of the center (ST207). The reverse traffic channel preamble is searched with the search window which has been established through such procedure (ST206).

When it is determined that the PN random delay is used, the PN random delay is calculated using a hash function with a factor of the ESN of the mobile station (IS-95 Spec 6.6.7.1) (ST205).

A new offset is set to a result value of subtracting the calculated PN random delay from the offset obtained at the time of acquisition of the access channel (ST204).

A center of a search window for searching the reverse traffic channel preamble when in conversion from the access channel to a traffic channel is set to the new offset and the search window is implemented (ST205). The reverse traffic channel preamble is searched with the implemented search window (ST206)

In short, the reverse traffic channel search method according to this embodiment of the present invention as described above employs the same search window size as used in the conventional technology and an improved part in this embodiment is that the reverse traffic channel is properly searched by shifting the center of the search window without wasting time in increasing the window size.

Figure 6:
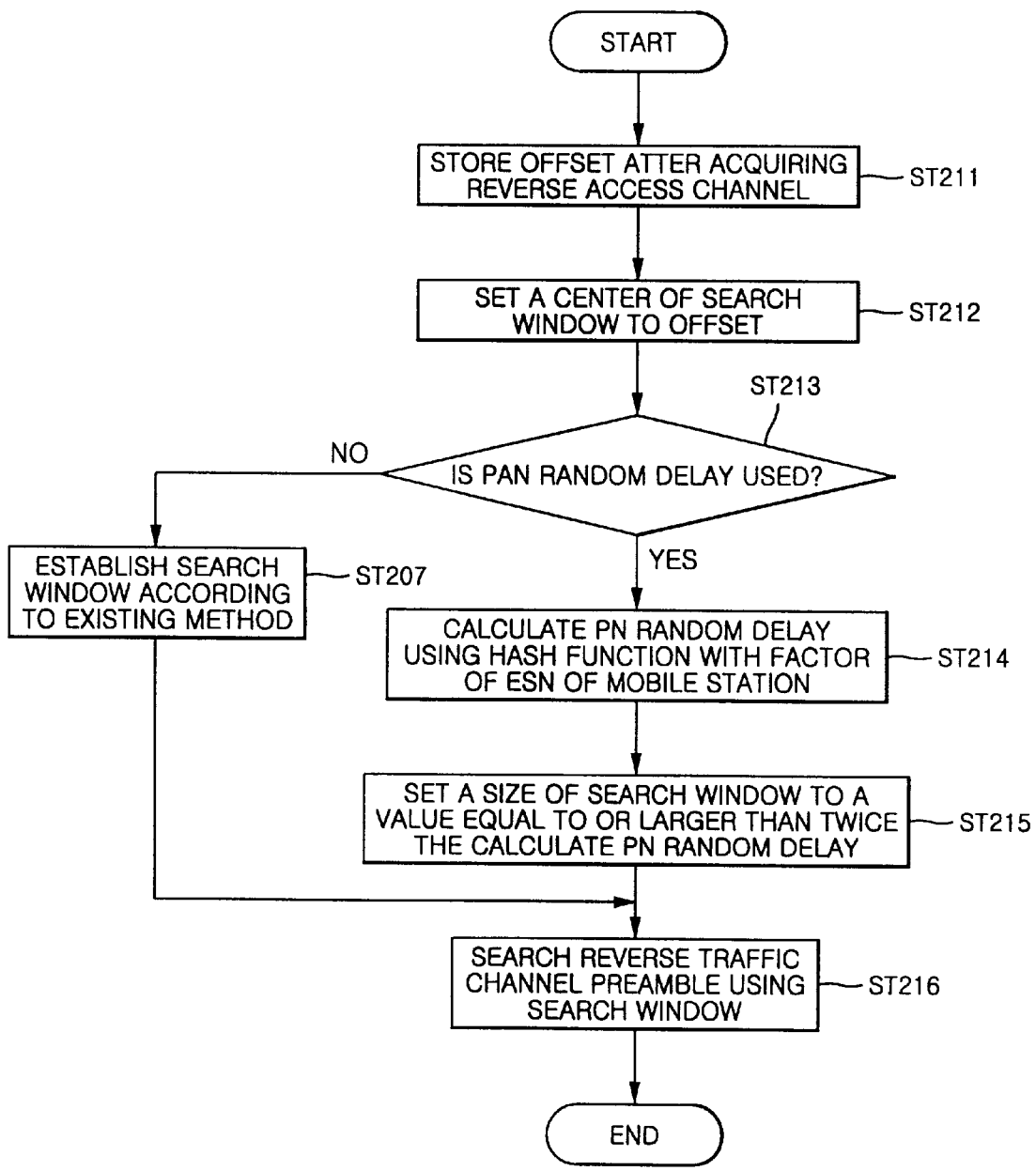
FIG. 6 is a flow chart of a reverse traffic channel search method in a CDMA mobile radio communication system according to the embodiment of the present invention depicted in FIG. 5.

FIG. 6 is a flow chart of a reverse traffic channel search method in a CDMA mobile radio communication system according to anther embodiment of the present invention.

As shown in FIG. 6, the method according to this embodiment of the present invention comprises the steps of: storing an offset by a propagation delay after acquiring a reverse access channel (ST211); setting a center of a search window using the offset, determining whether or not a PN random delay is applied to the reverse access channel, calculating the PN random delay using a hash function with a factor of an ESN transmitted from a mobile station when the PN random delay is applied to the reverse access channel (ST212 to ST214); setting a size of the search window to a result value of multiplying the calculated PN random delay by a predetermined value (ST215); and searching a reverse traffic channel preambles with the established search window (ST216).

Such reverse traffic channel search method according to the present invention will now be described in detail with reference to FIG. 5.

Figure 5:
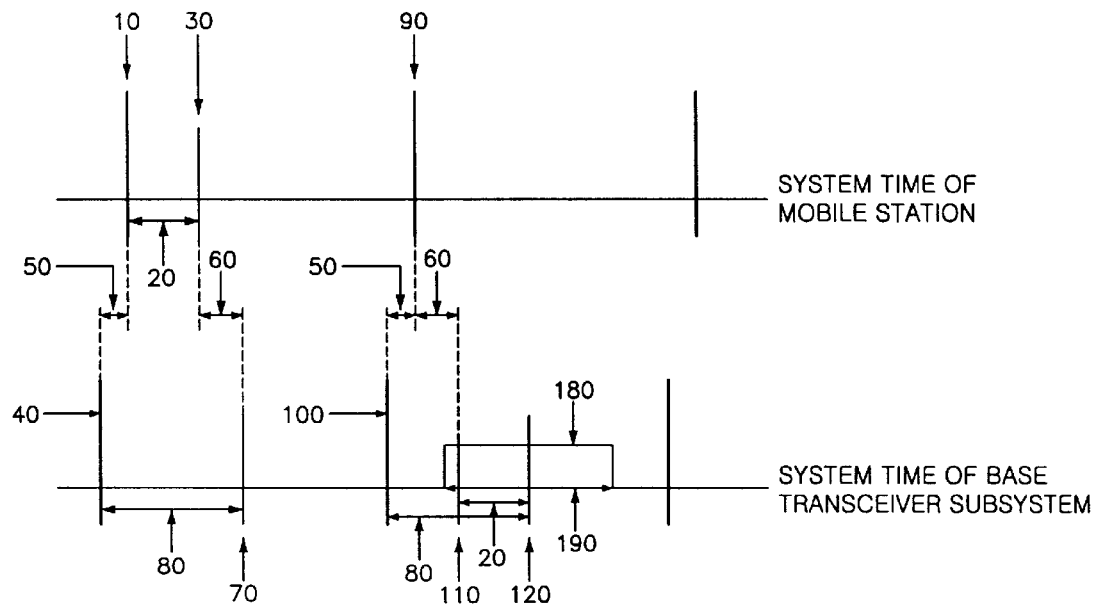
FIG. 5 is a diagram for explaining a reverse traffic channel search method in a CDMA mobile radio communication system according to another embodiment of the present invention.

As shown in FIG. 5, transmission of an access channel using a PN random delay is delayed by a PN random delay 20 determined in accordance with an ESN of a mobile station on the basis of an access channel slot boundary 10, which is a system reference time of the mobile station, so the mobile station starts to transmit the access channel at a time point 30.

Reception of the access channel at a base transceiver subsystem is delayed by the sum of the PN random delay 20 and a bothway propagation delay (the sum of a propagation delay 50 from the base transceiver subsystem to the mobile station and a propagation delay 60 from the mobile station to the base transceiver subsystem) on the basis of a system reference time 40 of the base transceiver subsystem, so the access channel is received at the base transceiver subsystem at a time point 70. An offset obtained after the base transceiver subsystem acquired the access channel corresponds to the sum of the bothway propagation delay and the PN random delay.

On receiving a channel assignment message which the base transceiver subsystem transmits after acquisition of the access channel, the mobile station transmits a traffic channel preamble at its system reference time 90 to maintain a link with the base transceiver subsystem. At this time, the PN random delay which was employed when transmitting the access channel is not used.

Since the reverse traffic channel preamble has the reverse propagation delay 60, reception of the reverse traffic channel preamble at the base transceiver subsystem is delayed by the bothway propagation delay on the basis of a system reference time 100 of the base transceiver subsystem, so the reverse traffic channel preamble is received at the base transceiver subsystem at a time point 110.

To acquire the reverse traffic channel preamble, the base transceiver subsystem sets a center of a search window 180 to a point 120 obtained by adding the offset obtained when acquiring the access channel to the system reference time 100 and computes the PN random delay 20 using the ESN contained in the acquired access channel transmitted from the mobile station.

Subsequently, a size of the search window is established to a value equal to or larger than twice the PN random delay 20 and then the base transceiver subsystem searches the reverse traffic channel preamble.

The size of the search window for searching the reverse traffic channel preambles at the base transceiver subsystem is automatically adjusted according to increase or decrease of PN random delays of each access channel transmitted from multiple mobile stations in this embodiment of the present invention, thereby saving time and trouble required when an operator manually establishes the size of the search window.

FIG. 6 is a flow chart of such reverse traffic channel search method according to the embodiment of the present invention as described above.

As shown in FIG. 6, after acquiring the access channel, the base transceiver subsystem stores the offset, sets the center of the search window to the offset, and checks whether or not the PN random delay is applied to the reverse access channel (ST211 to ST213).

Whereas the offset consists of only the bothway propagation delay when the PN random delay is not used, it consists of the bothway propagation delay and the PN random delay when the PN random delay is used.

Subsequently, when it is determined that the PN random delay is not used, the search window is implemented to have the same size as that of a conventional search window on the basis of the center set at the previous step and the reverse traffic channel preamble is searched with the search window (ST217 and ST216).

When it is determined that the PN random delay is applied to the reverse access channel, the PN random delay is calculated using a hash function with the factor of the ESN of the mobile station through the same way used at the mobile station (ST214).

The center of a search window for searching the reverse traffic channel preamble when in conversion from the access channel to a traffic channel is set to a value equal to or greater than two times the calculated PN random delay (ST215) and the reverse traffic channel preamble is searched with the implemented search window (ST216).

In short, according to such reverse traffic channel search method of the present invention as described above, the size of the search window is automatically adjusted to be twice the PN random delay or larger and the search window is used for searching the reverse traffic channel.

According to one embodiment of the present invention, when a mobile station uses a PN random delay, a base transceiver subsystem calculates the PN random delay using an ESN of the mobile station contained in an access channel acquired and sets a center of a search window to a new offset obtained by subtracting the calculated PN random delay from the offset obtained at the acquisition of the access channel, allowing for precise search of reverse traffic channels without increase of the size of the search window depending upon the PN random delays of each mobile station, thereby preventing a delay of the search occurring when an operation for increasing the size of the search window is performed in a conventional art and solving the problem that a call is not made because of insufficient size of the search window.

According to another embodiment, a size of a search window for searching reverse traffic channels at a base transceiver subsystem is automatically adjusted depending upon changing PN random delays applied to each access channel of multiple mobile stations, thereby saving time and trouble required when an operator manually establishes the size of the search window.

It will be apparent to those skilled in the art that various modifications and variations can be made in a method of searching reverse traffic channels in a CDMA mobile radio communication system of the present invention without deviating from the spirit or scope of the invention. Thus, it is intended that the present invention cover the modifications and variations of this invention provided they come within the scope of the appended claims and their equivalents.

What is claimed is:

1. A method of searching reverse traffic channels in a code division multiple access (CDMA) mobile radio communication system acquiring an offset by a propagation delay after acquiring a reverse access channel, calculating a PN random delay using a hash function with a factor of an electronic serial number (ESN), and setting a search window for searching the reverse traffic channel, the method comprising the steps of:

computing said acquired offset and said PN random delay and setting a new offset to a result of the computing; and determining a center of said search window as a delayed time point by the new set offset from the time of a base station system for searching said reverse traffic channel to thereby set said search window.

2. The method according to claim 1, wherein said new offset is set to a result value of subtracting said calculated PN random delay from said acquired offset.

3. A method of searching reverse traffic channels in a code division multiple access (CDMA) mobile radio communication system, by acquiring and storing an offset by a propagation delay after acquiring a reverse access channel, setting a center of a search window to said offset, and determining whether or not a pseudonoise (PN) random delay is applied to said reverse access channel; and when it is determined that said PN random delay is applied to the reverse access channel, calculating said PN random delay using a hash function with a factor of an electronic serial number (ESN) transmitted from a mobile station; the method comprising steps of:

establishing a size of the search window to a value equal to or greater than a predetermined number times said calculated PN random delay; and searching a reverse traffic channel preamble with said established search window, and determining a center of said search window as a delayed time point by the new set offset from the time of a base station system for searching said reverse traffic channel to thereby set said established search window.

4. The method according to claim 3, wherein said predetermined number is two.

* * * * *